United States Patent [19]
Tripathi et al.

[11] Patent Number: 6,113,681
[45] Date of Patent: Sep. 5, 2000

[54] TONER-MODIFIED ASPHALT COMPOSITIONS

[75] Inventors: Rakesh Tripathi, Waco; Kirby W. Pickett, Woodway; Mansour Solaimanian; Thomas W. Kennedy, both of Austin, all of Tex.

[73] Assignee: Texas Department of Transportation, Austin, Tex.

[21] Appl. No.: 09/374,369

[22] Filed: Aug. 13, 1999

[51] Int. Cl.$^7$ .................................................. C09D 195/00
[52] U.S. Cl. ................................ 106/284.05; 106/281.1; 524/59
[58] Field of Search ........................... 106/281.1, 284.05; 524/59

[56] References Cited

U.S. PATENT DOCUMENTS 5,021,476  6/1991  Pinomaa ..................................... 524/77
5,651,994  7/1997  Hara et al. ............................... 524/526

OTHER PUBLICATIONS

"Better asphalt with printer, copier waste," *Civil Engineering News*, (Jun. 1996), p. 29.
"Toning Asphalt," *Emerging Technology*, Jul./(Aug. 1996), pp. 1, 7.
Aileen Cho, "Waste Toner May Beef Up Asphalt," *ENR–Engineering News–Record*, (Sep.30, 1996), p.21.
Ruth W. Stidger, "Better Roads' award for research," *Better Roads*, (Jan. 1997), p.7.
Mike Wallace, "Valuable waste strengthening roads," *Waco Tribune–Herald*, (Feb. 2, 1997), p. 1C.
"Toner–in–asphalt method Reaches Application Testing Stage of Development," *Emerging Technology*, (May/Jun. 1997).
Rakesh Tripathi, "Waste Toner Disposal: Paving the Texas Turnpike" (presentation at *Toners & Photoreceptors* '97 (Jun. 1–4, 1997), Santa Barbara, CA).
Zachary Hinkle, "Valley Mills Drive repaving to resume," *Waco Tribune–Herald*, (Jul. 14, 1997.).
Zachary Hinkle, "Repaving work on Valley Mills Drive continues," *Waco Tribune–Herald*, (Jul. 1997.).
"Twofold Uses for Toner", *TTI Researchers* (Texas Transportation Inst.), p.11, (Summer 1997.).
"Copy Fluid Attacks Potholes," *Popular Mechanics*, (Oct. 1997.).
Mansour Solaimanian, Thomas W. Kennedy, and Rakesh Tripathi, "Performance Characteristics of Asphalt Binders and Mixtures Modified by Waste Toner," Paper No. 98–0045, *Transportation Research Record* No. 1638, "Asphalt Mixture Components", (Nov. 1998), pp. 120–128.
Solaimanian, "Superpave on Loop 396 . . . ", 1996.
Solaimanian, "Use of Waste Toner . . . ", Feb. 1997.

*Primary Examiner*—David Brunsman
*Attorney, Agent, or Firm*—Arnold White & Durkee; Ira David Finkelstein

[57] ABSTRACT

Modified asphalt cement is produced by blending asphalt with up to about 20% waste toner recovered from laser printers, copiers, and the like. The blending is carried out at high shear and at temperatures above the melting point of the toner. The toner-modified asphalt cement, and asphalt concrete made from the modified cement, both display significantly improved strength and temperature resistance properties relative to unmodified asphalt and asphalt concrete.

40 Claims, No Drawings

TONER-MODIFIED ASPHALT COMPOSITIONS

BACKGROUND OF THE INVENTION

The present invention relates to paving materials and methods, and in particular to modified asphalt compositions and methods for making and using them.

Asphalt is a viscous material that is derived from crude petroleum and is used in paving roads. Asphalt is generally understood to include asphaltenes, resins, and oils. While asphalt is primarily composed of hydrocarbon molecules (hydrogen and carbon), it also contains elements such as oxygen, nitrogen, and sulfur. Asphalt has an extremely diverse molecular structure depending on the crude source. Asphalts are thermoplastic materials—that is, they gradually liquefy when heated. Asphalts are characterized by their stiffness, consistency, or ability to flow at different temperatures.

Asphalt that has been specially prepared for use in pavement by controlling its quality and consistency is called asphalt cement. Asphalt cement is ordinarily used in a "hot mix" pavement composition that also contains coarse and fine aggregate. This composition, also called asphalt concrete, is blended at high temperature, applied to the roadbed, and compacted with rollers to produce a smooth driving surface.

Asphalt cement maybe modified by the addition of components that increase the strength of the material or otherwise alter its properties. In particular, it has become known in the art to add carbon black to asphalt as a filler material. It has also become known that one may add polymers to an asphalt blend in order to improve its strength and reduce its temperature susceptibility. Modification of asphalt with a variety of different polymers, including natural and synthetic rubber, acrylates, and styrene-acrylic copolymers has been described. Because the polymer modifiers that have been employed most beneficially as asphalt modifiers are rather expensive, a need exists for alternative, lower-cost modifiers that nonetheless impart improved properties comparable to those achieved by using the more expensive polymers.

Another pressing concern is a growing problem with solid waste disposal in general. The volume of solid waste generated annually in this country is growing steadily, while at the same time the available capacity of disposal sites is shrinking. This concern has led to a variety of initiatives for recycling. In 1991, for example, Congress mandated that state highway agencies investigate possible methods for using recycled materials in road construction. A number of different waste materials, including glass, shingles, shredded brush, shredded rubber tires, and a variety of other plastics have reportedly been blended into asphalt pavements in response to this mandate.

The quantity of waste toner currently being generated for landfill disposal raises particular concerns. Toner is the dry ink used in laser printers, copiers, and fax machines. Toner is a fine black powder mainly composed of styrene-acrylate copolymer and iron oxide. Some toners consist of more than 80 to 90 percent styrene-acrylate copolymer, about 5 to 10 percent carbon black, and a small amount of iron oxide. Some others, called single component toners, consist of about 40 to 50 percent styrene-acrylate copolymer, 40 to 50 percent iron oxide, and a small amount of carbon black and other ingredients. Approximately less than 5 percent of the toner may consist of polypropylene, silica, organic pigment, ferrite, and some additives.

The melting point of toner varies depending on the type and ranges between 100 to 150° C. In general, the toner specific gravity ranges between 1 and 1.7 depending on the type.

Waste toner is derived from two principal sources: material not sold by the toner manufacturer because it fails to meet manufacturing specifications, and post-consumer residual material from spent toner cartridges, printers, and copiers. Most used toner cannot be directly recycled and must be discarded. Although it is possible to incinerate waste toner to recover significant heat energy, most waste toner is disposed of by burial in landfills. Like most materials that are disposed of in landfills, waste toner does not degrade. Although estimates vary, the amount of waste toner produced and landfilled annually is roughly 9,000 to 25,000 tons. At a landfill disposal cost of at least $70/ton, this quantity of discarded waste toner costs the toner industry between $600,000 and $2,000,000 per year. This makes it especially desirable to develop alternative, more cost-effective methods for disposing of this material, and particularly methods for recycling it.

The use of asphalt in road building has gradually increased through the years and reached its peak in 1979. It is speculated that the current annual worldwide consumption of asphalt is over 100 million tons. Currently in the United States, the annual consumption is at least 25 million tons. Approximately 94 percent of U.S. roads are paved with asphalt.

Asphalt is used in road paving construction because it is a strong cement, readily adhesive, highly waterproof, and durable. It is a plastic substance that imparts controllable flexibility to mixtures of mineral aggregates with which it is usually combined. It is because of these superior qualities that asphalt is so widely used in road construction.

SUMMARY OF THE INVENTION

The present invention addresses the need for a satisfactory disposal method for waste toner, as well as the desirability of improving the properties of asphalt cement with lower cost modifiers. By blending up to about 20 percent waste toner into asphalt cement, modified asphalt is produced that displays significantly improved strength and resistance to high temperatures. At the same time, a waste material not readily disposable by environmentally compatible means is safely and productively recycled. In one aspect, the invention disclosed herein is a modified composition of asphalt cement containing up to about 20 percent toner, as well as asphalt concrete made with this modified asphalt cement. Another aspect of the invention disclosed herein includes preferred methods for making the modified asphalt cement by blending toner with asphalt cement at a temperature above the melting point of the toner. Further aspects of the invention include methods of using the modified asphalt to make hot mix asphalt concrete and methods of paving a driving surface with the modified hot mix.

DETAILED DESCRIPTION OF THE INVENTION

The following description is included to demonstrate preferred embodiments of the invention. It should be appreciated by those of skill in the art that the compositions and methods disclosed in the description which follows represent compositions and methods discovered by the inventor to function well in the practice of the invention, and thus can be considered to constitute preferred modes for its practice. However, those of skill in the art should, in light of the present disclosure, appreciate that one may make many changes in the specific embodiments which are disclosed and still obtain a like or similar result without departing from the scope of the invention.

Waste toner represents an ideal material for inclusion as an asphalt modifier for a number of reasons. First, each of the two primary components of the toner, styrene-acrylic copolymer and carbon black, is known to have a beneficial effect on the properties of asphalt. Second, substantial quantities of waste toner are potentially available at low cost. Finally, unlike many other waste materials such as glass or used tires, waste toner comes from its source as a fine, free-flowing powder, which obviates any need for preprocessing the toner before mixing it into the asphalt.

As a result of binder modification with toner, the high temperature properties of the binder are improved. This improvement takes place because of the increase in the high temperature stiffness of the binder. This modification results in higher stability and strength of asphalt concrete with a significantly high resistance against shoving and rutting.

There are two generally distinct approaches for producing a toner-modified asphalt concrete. The principal difference between the two approaches is the choice of the concrete component to be modified. On the one hand, it might be thought desirable to premix the powdery waste toner with the aggregate, which already contains a mixture of materials of different particle sizes including a substantial quantity of fines. However, the toner particles are still significantly smaller than the fine aggregate: the typical mean size for waste toner particles is about 10 $\mu$m, while fine aggregate suitable for asphalt concrete typically contains not more than 5 to 10 percent passing a no. 100 sieve (i.e., finer than 150 $\mu$m). As a result, the mixing operation generates considerable toner dust. Moreover, when toner is mixed with the aggregate it tends to function primarily as an inert filler rather than as a modifier.

While inert fillers do improve the stability and strength of hot mix asphalt concrete, their inclusion does not alter the properties of the concrete to the same extent that polymer-based modifiers added to the asphalt do. As used herein, "filler" is considered to include material passing the no. 200 (0.075 mm) sieve. In general, a filler material is introduced into the hot mix asphalt because it can provide added stability and strength. It is generally believed that the main action of a filler is to fill the voids between the coarse aggregates in the mixture. The effect of the filler on the binder depends on its geometric irregularities such as shape, angularity, and surface texture. The surface texture affects the surface activity—that is, the capacity of the filler surface to absorb binder. Another very important factor is the size distribution of the filler material. The larger filler particles probably serve to fill the voids between the coarse aggregates as described above. Very fine particles of filler may become suspended in the asphalt, forming a mastic. In general, a filler does not interact chemically with asphalt, and its effect is mainly mechanical. On the other hand, a modifier is expected to have a chemical interaction with the binder, changing its properties through such an interaction. Major binder properties that are influenced by modification include viscosity and stiffness. In general, the strategy behind modifying binders is to depend on the base asphalt to provide good low temperature properties while depending on the modifier to provide good high temperature properties.

Toner that is mixed into the asphalt concrete after the asphalt and aggregate have been combined also tends to act as a filler rather than as a modifier. A far preferable approach, therefore, is to blend waste toner into the asphalt before it is combined with aggregate. This may be accomplished by using oil or water to disperse toner into the asphalt. Water slurry blends are preferred over oil slurries because the latter tend to significantly increase the penetration value measured for the cement. Most preferably, however, the toner and asphalt should be dry blended at a temperature at least 10° C. above the melting point of the toner, which is typically about 100–150° C. The best results are achieved when the blending temperature is maintained above about 165° C.

In employing any of these blending methods it is extremely important to allow sufficient mixing time to ensure that the toner is uniformly distributed through the asphalt. As little as 30 minutes or as long as two hours of mixing may be required, depending on the shear rate, which in turn depends on the blade configuration of the mixer impeller and the speed of the motor. In addition, it is necessary to continue stirring the blend until it is about to be used.

A series of different tests have been used in the asphalt industry to characterize the behavior of asphalt binders. Conventional tests such as penetration and viscosity are still in use throughout the world. However, the new technology aims at determining binder characteristics in terms of "Superpave" performance-based binder tests. These tests provide information on the performance characteristics of the binder, such as its stiffness and modulus at different temperatures. Based on these results, it is possible to determine whether the tested binder is appropriate for certain climatic conditions. These tests are ideally suited for measuring the performance-enhancing effect of modified binders.

Binder viscosity is measured at 135° C. and 165° C. using a rotational viscometer (ASTM D4402). Viscosity at 135° C. is measured to determine the effect of the modifier on handling and pumping properties. The viscosity is also measured at 165° C. so that viscosity-temperature curves can be developed for determination of optimum mixing and compaction temperature.

Storage stability is measured using American Association of State Highway and Transportation Officials (AASHTO) test method PP5-93, which is a measure of the long-term stability of a modified binder after it has been left still at a high temperature for a sufficient period of time.

Complex shear modulus (G*) and phase angle ($\delta$) are measures of the overall shear stiffness of an asphalt binder. They are measured using a dynamic shear rheometer (DSR) in accordance with AASHTO TP5. A DSR measures the shear strain response of an asphalt binder to a dynamic shear stress. Shear stress is applied in a dynamic oscillatory shear mode at 10 radians per second. G* is computed as the ratio of the maximum shear stress ($\tau_{max}$) to the maximum shear strain ($\gamma_{max}$). Because of the viscoelastic properties of asphalt binders, the shear strain response is out of phase with the applied shear stress. The time lag between the applied stress and the resulting strain is converted to a phase angle ($\delta$).

G* and $\delta$ are measured on unaged binder, on binder that has been short-term aged in a rolling thin-film oven (RTFO), and on binder that has been long-term aged in a pressure aging vessel (PAV). The RTFO simulates binder aging in a hot mixing facility. Thus, measuring G* and $\delta$ on RTFO residue should estimate whether the addition of waste toner affects tender mix behavior or rutting resistance. The PAV creates a long-term aged binder with properties similar to about eight years in an actual pavement. The binder is aged in the PAV under a pressure of 2070 kPa at 100° C. for 20 hours. Measuring G* and $\delta$ on PAV residue will estimate whether the waste toner modified binders are too stiff at intermediate temperatures and might create a mix susceptible to fatigue cracking.

Finally, creep stiffness (S) and logarithmic creep rate (m) are measured on binders at low temperatures ranging from −12° to −24° C., according to AASHTO TP3. S and m are measured on PAV residue using a bending beam rheometer (BBR). A BBR measures the low temperature creep response of asphalt binder by using a deflection transducer to measure deflection as a function of time. S is computed at 8, 15, 30, 60, 120, and 240 seconds by using simple engineering beam principles. The logarithm of creep stiffness is plotted against the logarithm of loading time; the slope of the curve at 60 seconds is the m-value. A higher m-value means that a binder is more effective at shedding stresses that build up in asphalt when the pavement temperature drops. Measuring S and m on PAV residue will estimate whether waste toner modified binders are too stiff at low temperatures and whether such modification creates a mix susceptible to low temperature cracking.

When asphalt cement is modified in accordance with the technique described above, dramatic improvements in the cement's high-temperature performance are observed. A standard test for asphalt performance, the PG grade, identifies the temperatures between which a particular asphalt sample may be expected to exhibit satisfactory performance. For example, an asphalt graded as PG 64-28 is required for an area where the pavement temperature does not exceed 64° C. during the summer and does not fall below −28° C. in the winter. The use of such asphalt is not considered acceptable in hot climates where the summer pavement temperature may exceed 64° C. or in cold climates where the winter pavement temperature may drop below −28° C. The summer pavement temperature is determined as the average annual seven-day maximum pavement temperature, and the winter pavement temperature is calculated as the average annual minimum pavement temperature. Exposure to higher temperatures than the asphalt can manage will result in excessive deformation and rutting. Conversely, exposure to lower pavement temperatures than the asphalt can respond to may cause development of thermal cracks.

As shown in Table 1, the addition of 5 to 16% toner to a standard AC-20 asphalt grading PG 64-28 raised its high temperature limit from 64° C. to 70–76° C. At the same time, however, the low temperature limit also rose (from −28° C. to −16° C.) as the toner content increased. Similar results have been observed for toner-modified AC-5 asphalt cement.

material. Table 2 lists these rheological properties for AC-20 asphalt cement as a function of the toner content. It is particularly notable that the complex modulus G* increases parabolically as a function of toner content: that is, the effect of toner content on the stiffness of the asphalt becomes increasingly significant as the toner content is increased. Inert fillers such as silica do not display this trend. As noted above, however, and as shown in Table 2, the increased stiffness and reduced creep rate of the toner-modified asphalt also adversely affect the asphalt's performance at very low temperatures.

TABLE 2

Rheological Properties of Toner-Modified AC-20 Asphalt Cement

| Percent Waste Toner | G*/sin δ at 64° C., kPa | | Creep Stiffness, MPa | | Logarithmic Creep Rate | |
|---|---|---|---|---|---|---|
| | RTFO | | | | | |
| | Original | Aged | −12° C. | −18° C. | −12° C. | −18° C. |
| 0 | 1.0 | 3.0 | 140 | 275 | 0.32 | 0.29 |
| 5 | 2.0 | 5.0 | 170 | 320 | 0.32 | 0.28 |
| 10 | 2.5 | 9.0 | 190 | 325 | 0.30 | 0.25 |
| 16 | 5.5 | 14.5 | 250 | 430 | 0.27 | 0.26 |

As shown in Tables 3 and 4 below, the addition of toner to the asphalt cement, either by blending or by water slurry addition, also resulted in increases in viscosity. These increases represent an increase in the stiffness of the asphalt. In addition, several of the samples were aged in a rolling thin-film oven according to AASHTO T240, and the viscosities of the aged samples were remeasured. The difference between the initial and residual (i.e. aged) viscosity reflects the degree of stiffening of the asphalt with age. the dry blend samples displayed approximately the same age stiffening effect as the reference sample, while the water slurry blends showed significantly better resistance to aging.

The temperature susceptibility of the toner-modified asphalt, defined as the effect of increasing temperature on relative stiffness, was also significantly better than that observed for unmodified asphalt. The relative temperature susceptibility of toner-modified asphalt blends was inferred from the viscosity data in Table 3 by comparing the mag-

TABLE 1

Classification of Asphalt Cement (Performance Grading)

| AC Grade | % Waste Toner | High Temp. ° C. | Low Temp. ° C. | Interm. Temp. ° C. | PG Grade | AC Grade | % Waste Toner | High Temp. ° C. | Low Temp. ° C. | Interm. Temp. ° C. | PG Grade |
|---|---|---|---|---|---|---|---|---|---|---|---|
| 20 | 0 | 64 | −28 | 22 | 64–28 | 5 | 0 | 52 | −34 | 19 | 52–34 |
| 20 | 5 | 70 | −22 | 28 | 70–22 | 5 | 5 | 58 | −34 | 13 | 58–34 |
| 20 | 10 | 70 | −22 | 28 | 70–22 | 5 | 10 | 64 | −22 | 25 | 64–22 |
| 20 | 16 | 76 | −16 | 34 | 76–16 | 5 | 16 | 70 | −22 | 28 | 70–22 |

The improved engineering properties of toner-modified asphalt cement are also readily observed by using standard rheological test methods to measure the viscosity, complex shear modulus G* (defined as the ratio of maximum shear stress $\tau_{max}$ to maximum shear strain $\gamma_{max}$), phase angle δ, creep stiffness S, and logarithmic creep rate m of each nitude differences between absolute viscosity (measured in poise at 135° C.) and kinematic viscosity (measured in centistokes at 60° C.) for each sample. Except for the blend containing 16% toner, each of the dry blends displayed improved temperature susceptibility relative to the unmodified asphalt.

TABLE 3

Viscosity and Penetration Data for Dry Toner-Asphalt Blends

| Percent Solids | Penetration | Residual Penetration | Absolute Viscosity (Poise) | Residual Absolute Viscosity | Kinematic Viscosity (cSt) | Residual Kinematic Viscosity |
|---|---|---|---|---|---|---|
| 0 | 64 | 42 | 2261 | 5760 | 362 | 520 |
| 2 | 62 | 38 | 1594 | 5171 | 389 | 610 |
| 4 | 60 | 37 | 1688 | 6422 | 428 | — |
| 6 | 60 | 41 | 1915 | — | 424 | — |
| 8 | 62 | 37 | 1988 | — | 469 | — |
| 10 | 56 | 53 | 2096 | — | 464 | — |
| 12 | 58 | 51 | 2294 | — | 542 | — |
| 14 | 52 | 35 | 2466 | — | 535 | — |
| 16 | 52 | 35 | 2773 | — | 775 | — |

TABLE 4

Viscosity and Penetration Data for Water-Slurry Toner-Asphalt Blends

| Percent Solids | Penetration | Residual Penetration | Absolute Viscosity | Residual Absolute Viscosity | Kinematic Viscosity | Residual Kinematic Viscosity |
|---|---|---|---|---|---|---|
| 0 | 64 | 42 | 2261 | 5760 | 362 | 520 |
| 2 | 55 | — | 2530 | 3821 | 473 | 581 |
| 4 | 59 | — | — | 2572 | 464 | 504 |
| 6 | 60 | — | 2401 | — | — | — |
| 8 | 59 | — | 2758 | — | — | — |
| 10 | 61 | — | 2285 | — | — | — |
| 12 | 61 | — | — | — | — | — |
| 14 | 53 | — | 2772 | — | — | — |
| 16 | 45 | — | 3177 | — | — | — |

The optimum amount of toner that should be added to a particular asphalt cement will depend somewhat on the characteristics of the unmodified cement as compared with the desired results. However, in the tests described above it has generally been found beneficial to include at least 5 weight percent toner in the asphalt. For many applications, a toner content of about 5% to 10% offers a good balance of properties between stiffness and viscosity on the one hand and strength, stability, and temperature susceptibility on the other. As will be described in the example below, toner-asphalt blends containing about 7 weight percent toner have displayed extremely satisfactory performance.

The improved properties of the toner-modified asphalt cement are also reflected in the improved performance of asphalt concrete made from the modified asphalt. This concrete is made from the modified asphalt by mixing the modified asphalt with fine and coarse aggregate at high temperature, using methods and proportions similar to those traditionally employed in making asphalt concrete from unmodified asphalt cement.

Engineering characteristics of asphalt concrete are defined in terms of properties such as modulus, strength, and stability. One term commonly used is called the resilient modulus, which is determined from the results of repeated loading of an asphalt concrete specimen. The resilient modulus is calculated as a function of the applied load and the recovered deformation under each cycle of load. Resilient modulus is, in a way, a measure of the asphalt concrete stiffness. Another measure of the quality of asphalt concrete is the indirect tensile strength, which is a direct measure of the asphalt concrete strength. The indirect tensile strength of a specimen is measured by applying a load to the specimen and gradually increasing the load until the specimen fails under the developed tensile stresses. A third measure of the asphalt concrete quality is its Hveem stability. This is a strength index providing information on the shear resistance of the aggregate structure as well as overall strength of the asphalt concrete.

The data in Table 5 reflect the gains in resilient modulus, indirect tensile strength and Hveem stability that are achieved by using toner-modified asphalt to make the asphalt concrete. As shown in the last column of Table 5, this improved performance does not significantly alter the asphalt content that is required in the hot mix to achieve an acceptable air void level in the asphalt concrete (i.e., about 4% void volume). One practical implication of these results is that it should be possible to use toner-modified asphalt to make asphalt concrete meeting industry strength and stability specifications from aggregate that normally would result in off-specification asphalt concrete if it were blended with unmodified asphalt.

TABLE 5

Properties of Toner-Modified Asphalt Concrete

| Percent Waste Toner | Resilient Modulus, MPa | Indirect Tensile Strength, kPa | Hveem Stability | Asphalt Content at 4% Air Void Level |
|---|---|---|---|---|
| 0 | 1550 | 750 | 52 | 5.2–5.3 |
| 5 | 1600 | 950 | 55 | 5.5 |
| 16 | 2000 | 1400 | 63 | 5.5 |

Asphalt concrete containing asphalt cement modified as described herein requires no special technique for application to a roadbed as compared with unmodified asphalt concrete. Nevertheless, it is preferable to blend the components just prior to use because the asphalt-toner blend must be continuously agitated at high temperature until it is mixed with the aggregate.

The long-term performance of an asphalt concrete pavement is the ultimate measure of the quality of the mix design and construction. A number of different measures are used to evaluate long-term performance. One common approach is the pavement condition index (PCI), which ranges from 0 to 100, with 100 representing a new pavement in excellent condition and 0 representing completely deteriorated pavement that is impassable. Another is the pavement serviceability index (PSI), which ranges from 0 to 5, with 5 being the highest level of serviceability. Various types of instruments are used to determine the condition of the pavement surfaces. These instruments measure ride quality, structural adequacy and skid resistance. However, periodic visual surveying of the pavement surface to assess the level of distress still remains a valuable approach. The most common types of distresses to be investigated include permanent deformation, fatigue cracking, and low temperature cracking. It is best to evaluate the pavement condition at least once a year. There is no universal agreement as to how long the pavement needs to be monitored before it may be considered to have shown satisfactory performance. Since some states specify a five-year period in their warranty specifications, this may represent an appropriate monitoring period. However, it should be noted that the asphalt concrete layer is expected to last for considerably longer periods.

EXAMPLE

A modified asphalt cement was produced by passing approximately 18.5 metric tons of dry waste toner and 265 metric tons of PG 64-22 asphalt binder three times through a high shear blender at a temperature of 165° C. over a period of about 30 minutes. The resulting asphalt cement, which contained about 7% toner, was blended with approximately 5870 metric tons of aggregates and applied by conventional methods to a two-kilometer section of a six-lane highway. The road was inspected regularly at three-month intervals for distress, failure, rutting and other signs of abnormal wear. The pavement remains in pristine condition nearly two years after application of the modified asphalt concrete.

In view of the above disclosure, one of skill in the art should understand that one illustrative embodiment of the present invention includes a modified asphalt composition containing up to about 20% toner. Such toner may be waste toner unsold by a toner manufacturer or recovered either from a printer, copier, or similar device or from a spent toner cartridge used in such a device.

Another illustrative embodiment of the present invention is a method for producing toner-modified asphalt cement, which method may include the step of blending asphalt with up to about 20% toner at a temperature exceeding the melting point of the toner. This blending may be carried out with or without the use of a liquid blending agent such as oil or water to disperse the toner particles. The toner may optionally be waste toner as described above.

Yet another illustrative embodiment of the present invention is a method for producing toner-modified asphalt concrete. This method may include the step of blending asphalt with up to about 20% toner at a temperature exceeding the melting point of the toner, followed by blending the toner-asphalt mixture with coarse and fine aggregates. The blending of toner and asphalt may be carried out with or without the use of a liquid blending agent such as oil or water to disperse the toner particles. The toner may optionally be waste toner as described above.

A final illustrative embodiment of the present invention is a method of paving a driving surface with toner-modified asphalt concrete. This method may include the steps of blending asphalt with up to about 20% toner at a temperature exceeding the melting point of the toner; blending the toner-asphalt mixture with coarse and fine aggregates to form asphalt concrete; applying the asphalt concrete to a roadbed; and compacting the asphalt concrete to form a smooth driving surface.

All of the processes and compositions disclosed and claimed herein may be made and executed without undue experimentation in light of the present disclosure. While the compositions and methods of this invention have been described in terms of preferred embodiments, it should be apparent to those of skill in the art that variations may be applied to the compositions and in the steps or in the sequence of steps of the methods described herein without departing from the concept and scope of the invention. All such similar substitutes and modifications apparent to those skilled in the art are considered to be within the scope and concept of the invention as defined by the appended claims.

What is claimed is:

1. A pavement composition comprising asphalt cement, aggregate, and an amount of toner effective to significantly improve the stability, strength, or wear resistance of said composition, said toner comprising polymer and carbon black, wherein the toner and the asphalt cement have been blended at a temperature greater than the melting point of the toner.

2. The composition of claim 1, wherein said weight ratio is between 0.10 and about 0.20.

3. The composition of claim 1, wherein said weight ratio is between about 0.05 and about 0.10.

4. The composition of claim 1, wherein said weight ratio is about 0.07.

5. The composition of claim 1, wherein said toner is waste toner.

6. The composition of claim 1, wherein said polymer comprises styrene-acrylic copolymer.

7. A method of making reinforced asphalt cement, comprising blending with the asphalt cement an amount of toner effective to significantly improve the strength, rheological properties or high temperature resistance of the asphalt cement, wherein said toner comprises polymer and carbon black and said blending is performed at a temperature greater than the melting point of the toner.

8. The method of claim 7, wherein said blending of toner with asphalt cement is carried out in a high shear blender at a temperature above about 165° C.

9. The method of claim 8, wherein the weight ratio of toner to asphalt cement is greater than 0 and less than about 0.20.

10. The method of claim 9, wherein said toner is waste toner.

11. The method of claim 8, wherein the weight ratio of toner to asphalt cement is between 0.10 and about 0.20.

12. The method of claim 8, wherein the weight ratio of toner to asphalt cement is greater than 0 and less than about 0.16.

13. The method of claim 8, wherein the weight ratio of toner to asphalt cement is between about 0.05 and about 0.10.

14. The method of claim 8, wherein the weight ratio of toner to asphalt cement is about 0.07.

15. The method of claim 7, wherein the toner is dry blended with the asphalt cement.

16. The method of claim 15, wherein said toner is waste toner.

17. The method of claim 7, wherein said toner is waste toner.

18. The method of claim 7, wherein said polymer comprises styrene-acrylic copolymer.

19. A method of making reinforced asphalt concrete, comprising:

blending toner comprising polymer and carbon black with asphalt cement at a temperature greater than the melting point of the toner to form a toner/cement blend, and blending the toner/cement blend with aggregate, wherein said toner is present in the blend in an amount effective to significantly improve the resilient modulus, indirect tensile strength, or Hveem stability of the concrete.

20. The method of claim 19, wherein said blending of toner with asphalt cement is carried out in a high shear blender at a temperature above about 165° C.

21. The method of claim 20, wherein the weight ratio of toner to asphalt cement is between 0.10 and about 0.20.

22. The method of claim 20, wherein the weight ratio of toner to asphalt cement is greater than 0 and less than about 0.16.

23. The method of claim 20, wherein the weight ratio of toner to asphalt cement is between about 0.05 and about 0.10.

24. The method of claim 20, wherein the weight ratio of toner to asphalt cement is about 0.07.

25. The method of claim 20, wherein said toner is waste toner.

26. The method of claim 19, wherein the weight ratio of toner to asphalt cement is between 0.10 and about 0.20.

27. The method of claim 19, wherein the weight ratio of toner to asphalt cement is between about 0.05 and about 0.10.

28. The method of claim 19, wherein said toner is waste toner.

29. The method of claim 19, wherein said polymer comprises styrene-acrylic copolymer.

30. A method of paving a driving surface, comprising:

a) blending toner comprising polymer and carbon black with asphalt cement at a temperature greater than the melting point of the toner to form a toner/asphalt blend, wherein the toner is present in the blend in an amount effective to significantly improve the strength, high temperature resistance, or rheological properties of said asphalt cement;

b) blending the toner/asphalt blend with aggregate to form asphalt concrete; and c) applying the asphalt concrete to the driving surface.

31. The method of claim 30, wherein the weight ratio of toner to asphalt cement is greater than 0 and less than about 0.20.

32. The method of claim 31, wherein said toner is waste toner.

33. The method of claim 30, wherein said blending of toner with asphalt cement is accomplished by dry blending.

34. The method of claim 30, wherein the weight ratio of toner to asphalt cement is between 0.10 and about 0.20.

35. The method of claim 30, wherein the weight ratio of toner to asphalt cement is between 0.10 and about 0.16.

36. The method of claim 30, wherein the weight ratio of toner to asphalt cement is between about 0.05 and about 0.10.

37. The method of claim 30, wherein the weight ratio of toner to asphalt cement is about 0.07.

38. The method of claim 37, wherein said toner is waste toner.

39. The method of claim 37, wherein said blending of toner and asphalt cement is accomplished by dry blending.

40. The method of claim 30, wherein said polymer comprises styrene-acrylic copolymer.

* * * * *